(12) United States Patent
Block et al.

(10) Patent No.: US 8,756,939 B2
(45) Date of Patent: *Jun. 24, 2014

(54) METHOD AND SYSTEM FOR TESTING AN OVERSPEED PROTECTION SYSTEM OF A POWERPLANT MACHINE

(75) Inventors: Frederick William Block, Campobello, SC (US); Richard Lee Nichols, Simpsonville, SC (US); Joseph Robert Law, Greer, SC (US); Bret Stephen Dalton, Greer, SC (US); George Allen Ellis, Woodruff, SC (US)

(73) Assignee: General Electric Company, Schenectady, NY (US)

( * ) Notice: Subject to any disclaimer, the term of this patent is extended or adjusted under 35 U.S.C. 154(b) by 1128 days.

This patent is subject to a terminal disclaimer.

(21) Appl. No.: 12/729,666

(22) Filed: Mar. 23, 2010

(65) Prior Publication Data

US 2011/0232297 A1   Sep. 29, 2011

(51) Int. Cl.
*F02C 7/00* (2006.01)
*F02C 9/46* (2006.01)
*F01D 21/02* (2006.01)
*F01D 21/00* (2006.01)

(52) U.S. Cl.
CPC .......... *F01D 21/02* (2013.01); *F05D 2270/304* (2013.01); *Y02E 20/16* (2013.01); *Y02T 10/82* (2013.01); *F05D 2270/091* (2013.01); *F01D 21/003* (2013.01)

USPC .............. 60/779; 60/39.091; 60/773; 60/793; 73/112.01; 73/112.02; 73/112.03

(58) Field of Classification Search
USPC .............................. 60/779, 39.091, 773, 793; 73/112.01–112.03
See application file for complete search history.

(56) References Cited

U.S. PATENT DOCUMENTS

| | | | | |
|---|---|---|---|---|
| 3,614,457 | A | * | 10/1971 | Eggenberger ............... 290/40 R |
| 5,301,499 | A | * | 4/1994 | Kure-Jensen et al. .......... 60/773 |
| 7,355,828 | B2 | * | 4/2008 | Jones .............................. 361/51 |
| 7,677,089 | B2 | * | 3/2010 | Block et al. ................. 73/112.01 |
| 7,716,971 | B2 | * | 5/2010 | Block et al. ................. 73/112.01 |
| 8,365,583 | B2 | * | 2/2013 | Block et al. ................. 73/112.01 |
| 8,661,880 | B2 | * | 3/2014 | Block et al. ................. 73/112.01 |
| 2007/0013365 | A1 | | 1/2007 | Jones |
| 2008/0101918 | A1 | * | 5/2008 | Block et al. ..................... 415/30 |

* cited by examiner

*Primary Examiner* — Craig Kim
(74) *Attorney, Agent, or Firm* — Ernest G. Cusick; Frank A. Landgraff

(57) ABSTRACT

Embodiments of the present invention have the technical effect of automatically testing an overspeed protection system of a powerplant machine comprising at least one shaft. An embodiment of the present invention may automatically test the overspeed protection system while the powerplant machine is decelerating from full-speed-no-load (FSNL). Another embodiment of the present invention may automatically test the overspeed protection system of the powerplant machine while the powerplant machine is accelerating to FSNL.

20 Claims, 6 Drawing Sheets

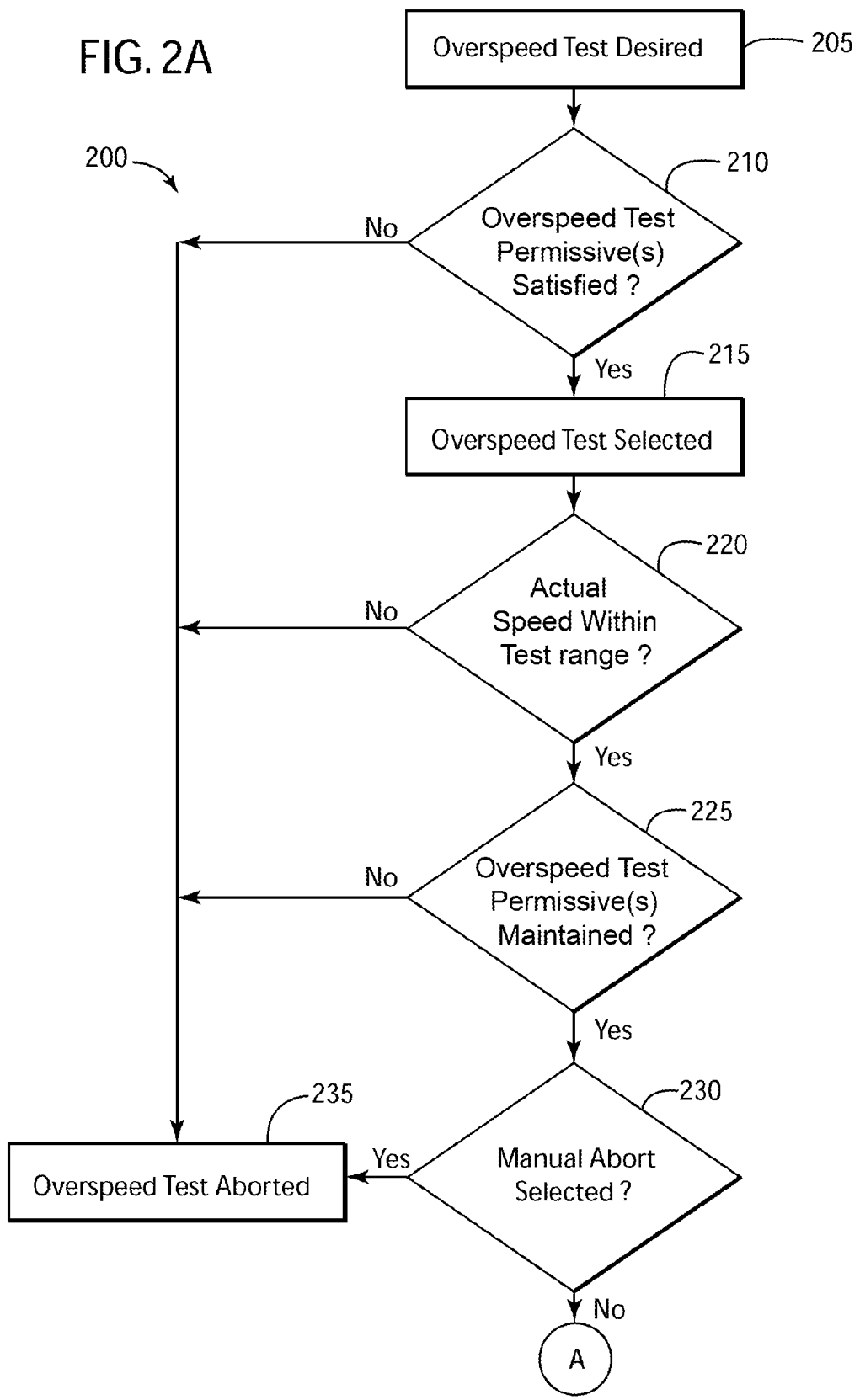

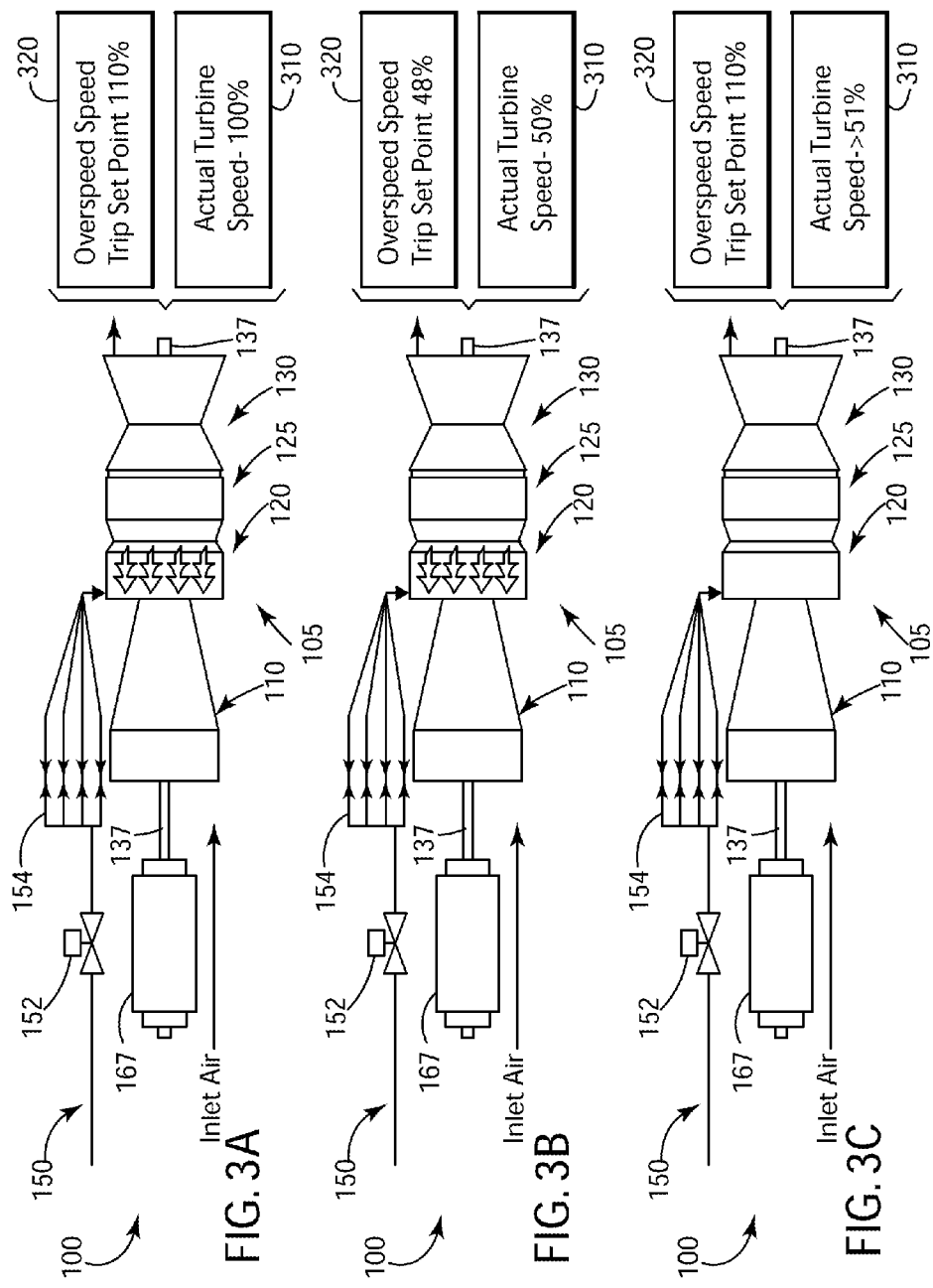

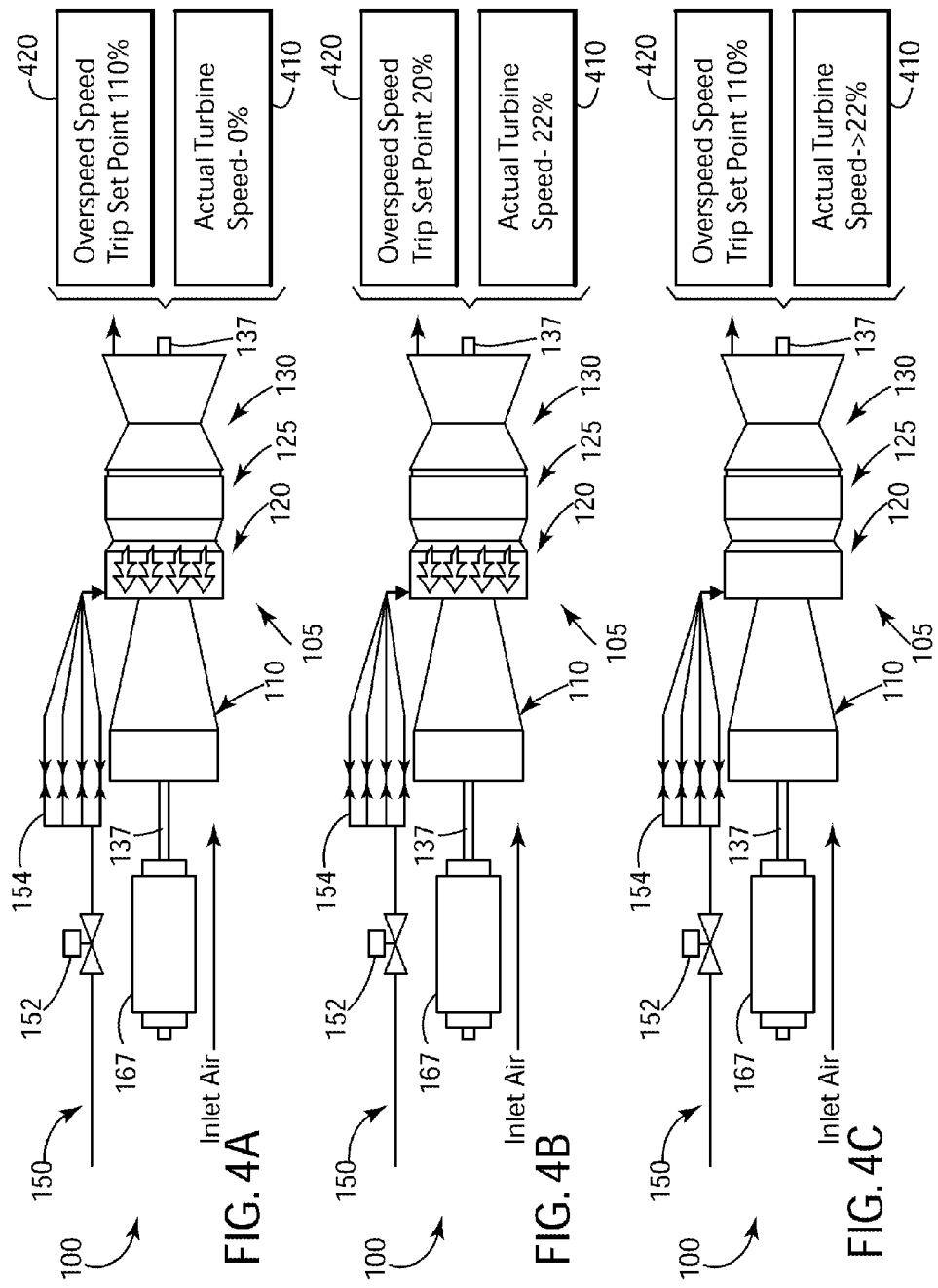

METHOD AND SYSTEM FOR TESTING AN OVERSPEED PROTECTION SYSTEM OF A POWERPLANT MACHINE

This application is related to commonly-assigned U.S. patent application Ser. No. 11/584,095, filed Oct. 20, 2006; and U.S. patent application Ser. No. 11/589,579, filed Oct. 30, 2006.

BACKGROUND OF THE INVENTION

The present invention relates to a protection system of a powerplant machine; and more particularly to an automated overspeed protection system for the powerplant machine.

An overspeed condition occurs after the speed of a shaft on a powerplant machine exceeds a specified range. During the overspeed condition, a powerplant machine typically experiences severe mechanical and thermal stresses that can cause a catastrophic failure.

Generally, the powerplant machine is equipped with protection systems, which attempt to reduce the effects of an overspeed condition. A governor system generally serves as the primary line of protection. Upon detecting an overspeed condition, the governor attempts to decrease the speed of the shaft. There may also be a secondary, or independent line, of protection—an overspeed protection system. Typically, the overspeed protection system incorporates mechanical, electrical, and software components to safeguard the powerplant machine. An overspeed protection system protects the powerplant machine by initiating an emergency shutdown (commonly called a trip) during an overspeed event.

Powerplant operators periodically test the overspeed protection system to determine if the system is functioning properly. Prior to testing the overspeed protection system, the powerplant machine is customarily operating in a full-speed-no-load (FSNL) condition. FSNL is a condition when the powerplant machine is at a normal operating speed and is not exporting energy to a load. An overspeed test typically involves manually raising the speed of a shaft above the normal operating range. For example, but not limiting of, during an overspeed test operators may raise the speed of the shaft to 110% of the normal operating speed; thereafter the overspeed protection system should trip the powerplant machine.

There are a few problems with the current method of overspeed testing. Manually adjusting the shaft speed may introduce high thermal transients. A trip at a speed near or above the normal operating speed can introduce large mechanical, electrical, and thermal stresses on the components of the powerplant machine. These stresses decrease the maintenance interval. Moreover, after a trip, a re-start of the powerplant machine is required, which delays the exporting of energy. In addition, the current overspeed testing methods typically require that the powerplant machine operate at FSNL. This does not generate revenue but consumes fuel and electricity. These problems drive powerplant machine operators to avoid manual speed adjustments, trips, FSNL operation, and overspeed testing.

For the foregoing reasons, there is a need for a method of testing an overspeed protection system that reduces the chance of a trip. The method should be adaptable to a wide variety powerplant machines, including those integrated with others powerplant machines. The method should allow for testing the overspeed protection system when the powerplant machine is accelerating from a start-up mode, or decelerating from FSNL.

BRIEF DESCRIPTION OF THE INVENTION

In accordance with an embodiment of the present invention, a method of testing an overspeed protection system of a powerplant, the method comprising: providing a powerplant comprising a powerplant machine, a shaft, and an operational control system, wherein the operational control system is configured for operating the powerplant machine and comprises an overspeed protection system configured for detecting an overspeed event associated with the shaft; determining whether the speed of the shaft is within a testing range; changing an overspeed trip value to a value within the testing range; and determining whether the overspeed protection system would operate to trip the powerplant machine; wherein the method reduces the possibility of a trip occurring during testing of the overspeed protection system.

In accordance with an alternate embodiment of the present invention, a method of testing an overspeed protection system of a powerplant, the method comprising: providing a powerplant comprising a gas turbine and a steam turbine, and wherein a shaft integrates the gas turbine and the steam turbine forming a steam and gas powertrain (STAG); providing an operational control system, wherein the operational control system is configured for operating the STAG and comprises an overspeed protection system configured for detecting an overspeed event associated with the shaft; selecting a methodology for testing the overspeed protection system, wherein the methodology comprises a shutdown mode procedure adapted for use when the STAG is operating in a shutdown mode, and a start-up mode procedure adapted for use when STAG is operating in a start-up mode; determining whether the speed of the shaft is within a testing range; changing an overspeed trip value to a value within the testing range; and determining whether the overspeed protection system would operate to trip the STAG; wherein the method reduces the possibility of a STAG trip during testing of the overspeed protection system.

BRIEF DESCRIPTION OF THE DRAWING

FIGS. 2A-2B (collectively FIG. 2) are flowcharts illustrating an example of a method of testing an overspeed protection system in accordance with an embodiment of the present invention.

FIGS. 3A-3C (collectively FIG. 3) are schematics illustrating the method of FIG. 2, in use, in accordance with an embodiment of the present invention.

FIGS. 4A-4C (collectively FIG. 4) are schematics illustrating the method of FIG. 2, in use, in accordance with an alternate embodiment of the present invention.

DETAILED DESCRIPTION OF THE INVENTION

Figure 1:
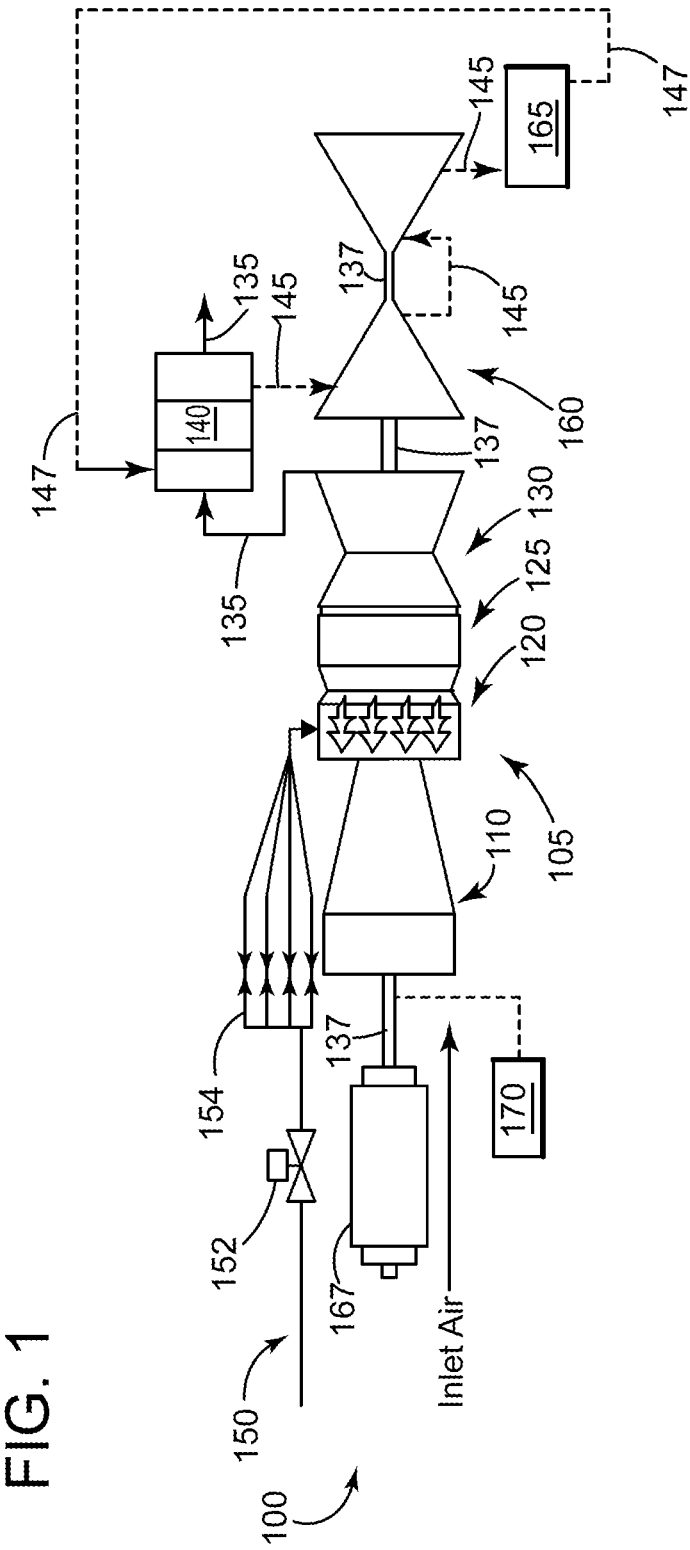
FIG. 1 is a schematic illustrating the environment in which an embodiment of the present invention operates.

The present invention has the technical effect of automatically testing an overspeed protection system of a powerplant machine comprising at least one shaft. An embodiment of the present invention may automatically test the overspeed protection system while the powerplant machine is decelerating from FSNL. Another embodiment of the present invention may automatically test the overspeed protection system of the powerplant machine while the powerplant machine is accelerating to FSNL.

Detailed example embodiments are disclosed herein. However, specific structural and functional details disclosed herein are merely representative for purposes of describing example embodiments. Example embodiments may, however, be embodied in many alternate forms, and should not be construed as limited to only the embodiments set forth herein.

Accordingly, while example embodiments are capable of various modifications and alternative forms, embodiments thereof are illustrated by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted might occur out of the order noted in the FIGS. Two successive FIGS., for example, may be executed substantially concurrently or may sometimes be executed in the reverse order, depending upon the functionality/operations involved.

The present invention may be applied to many forms of powerplant machines, which may be considered a machine that transfers energy, in part by rotating a shaft. Some powerplants are configured with multiple powerplant machines, such as, but not limiting of, turbomachines, and others with rotating shafts. The powerplant configurations may include, but are not limited to, a steam turbine and a gas turbine integrated by a single shaft (commonly called a single-shaft STAG); or a multiple turbines integrated via multiple shafts. The shaft integrates multiple powerplant machines, allowing each powerplant machine to contribute to the torque that rotates the shaft. Therefore, embodiments of the present invention may be applied to a single powerplant machine comprising a single shaft; a single powerplant machine comprising multiple shafts; multiple powerplant machines integrated in a STAG configuration; or multiple powerplant machines integrated via multiple shafts.

Embodiments of the present invention may apply to a wide variety of powerplant machines having the form of a rotating machine such as, but not limiting of, radial, axial, centrifugal machines in open and/or closed systems. This may include, but is not limited to, the following: axial turbines, axial compressors, centrifugal compressors, helical screw compressors, radial-inflow turbines, torque converters, pumps, fans, blowers, hydraulic turbines, marine propellers, wind turbines, or any combination thereof.

The powerplant machine may also have the form of a turbomachine configured for producing power and/or consuming power. These turbomachines may include, but are not limited to, combustion turbines and steam turbines. These turbomachines may primarily function to increase pressure of a working fluid. Non-limiting examples of the working fluid including: air, water, gas, physical matter, or any combination, thereof. These turbomachines may consume a wide variety of energy sources, such as, but not limiting of, gas, liquid fuel, air, water, vapor, wind, electricity, thermal, steam, or any combination thereof.

Embodiments of the present invention may be applied to powerplant machines operating in a wide variety of applications including, but not limited of, the following: aerospace, automotive, refrigeration, heating, industrial, power generation, marine, chemical, agricultural, petrochemical, mechanical drives, pumps, fans blowers, compressors, and the like.

Referring now to the FIGS., where the various numbers represent like elements throughout the several views, FIG. 1 is a schematic illustrating an environment in which an embodiment of the present invention may operate. FIG. 1 illustrates a powerplant 100, in a combined cycle configuration, having a gas turbine 105 and a steam turbine 160. A shaft 137 integrates the gas and steam turbines, 105,160. This configuration is considered a single-shaft STAG powertrain. Although, the embodiments of the present invention are described herein with reference to a single-shaft STAG application, the present invention may be applied to other powerplant configurations. Embodiments of the present invention may also be applied to a single powerplant machine comprising a single shaft; a single powerplant machine comprising multiple shafts; or multiple powerplant machines integrated via multiple shafts.

The gas turbine 105 generally comprises a compressor section 110, a combustion system 120, a turbine section 125, and an exhaust section 130. Generally, the compressor 110 ingests and compresses an inlet air, represented by an arrow in FIG. 1. The compressed air may flow downstream to the combustion system 120, where the compressed air is mixed with a fuel, such as, but not limiting of, a natural gas, received from the gas fuel system 150, and then combusted. The energy released during the combustion process flows downstream and drives the turbine section 125. A load, such as, but not limiting of, a generator 167 may be coupled to the gas turbine 105 via the shaft 137. Here, the mechanical torque generated in the turbine section 125 drives the generator 167.

The exhaust 135 generated during the operation of the gas turbine 105 may flow downstream through an exhaust section 130 and may be received by a heat recovery steam generator (HRSG) 140. The HRSG 140 utilizes a heat exchanging process to transfer some of the heat in the exhaust 135 to condensate or feedwater 147, creating steam 145. The steam 145 may flow downstream to a steam turbine 160, coupled to gas turbine 105, via the shaft 137. After flowing through the steam turbine 160, the steam 145 may condense in a condensor 165, forming the condensate 147. A condensate or feedwater pump (not illustrated) may then drive the condensate or feedwater 147 into the HRSG 140, where the aforementioned process may be repeated. After flowing through the HRSG 140, the exhaust 135 may flow to the stack (not illustrated). As the steam 145 flows through the steam turbine 160, the energy of the steam 145 is transferred into mechanical torque that drives the shaft 137.

An operational control system 170 may monitor and control the operation of the powerplant 100. In accordance with embodiments of the present invention, the operational control system 170 may implement the overspeed testing system as described below.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program. Any suitable computer readable medium may be utilized.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory. These instructions can direct a computer or other programmable data processing apparatus to function in a particular manner. This is such that the instructions stored in the computer-readable memory produce an article of manufacture including instruction means which implement the function/act specified in the flowchart and/or block diagram block or blocks. The computer program instructions may also be loaded onto a computer or other programmable data processing apparatus. These instructions may cause a series of operational steps to be performed on the computer or other programmable apparatus to produce a computer implemented process. Here, the instructions, which execute on the computer or other programmable apparatus, provide steps for implementing the functions/acts specified in the flowchart and/or block diagram blocks.

Figure 2B:
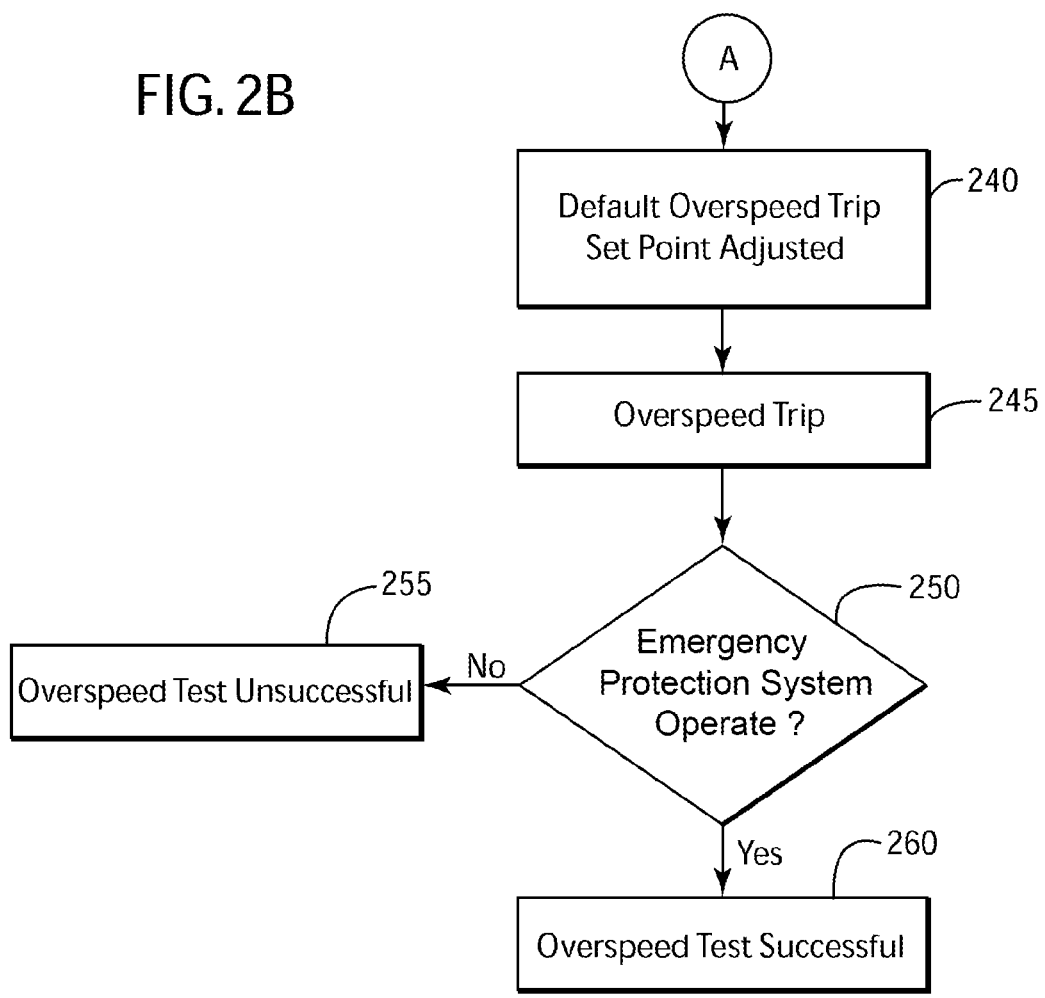

Referring again to the FIGS., FIGS. 2A-2B (collectively FIG. 2) are flowcharts illustrating an example of a method 200 of testing an overspeed protection system in accordance with an embodiment of the present invention. In an embodiment of the present invention, an operator may use the operational control system 170 to monitor and/or control the operation of the method 200, via a graphical user interface (GUI) or the like.

Embodiments of the method 200 may allow a user to test the overspeed protection system while the shaft is rotating within a broad speed range, which may be considered a test range. For example, but not limiting of, in an embodiment of the present invention the test range may range from around a purge speed to around FSNL.

A significant benefit of the present invention is the ability to test the overspeed protection system via two methodologies. The shutdown methodology allows a user to test the overspeed protection system while the powerplant machine is in the process of decelerating from, for example, but not limiting of, FSNL. The start-up methodology allows a user to test the overspeed protection system while the powerplant machine is in the process of accelerating to, for example, but not limiting of, FSNL. The features and advantages of each methodology are discussed below.

In step 205, the method 200 may have determined that a test of the overspeed protection system is desired. Here, an operator may use the GUI to indicate that a test of the overspeed protection system is desired.

In step 210, the method 200 may determine whether an overspeed test permissive is satisfied. A user may configure a plurality of permissives that are prerequisites to testing. These permissives may be used to ensure a specific operating state prior to testing. For example, but not limiting of, the overspeed test permissive may include: an inlet guide vane position; a compressor protection system status; and an inlet air system status, inlet bleed heat, or the like. If the overspeed test permissive is not satisfied, then the method 200 may proceed to step 234; otherwise the method 500 may proceed to step 215.

In step 215, the method 200 may determine which overspeed test is selected. Here, the user may select which of the aforementioned testing methodologies may be appropriate for the operating state of the powerplant machine.

In step 220, the method 200 may determine whether the speed of the shaft 137 is within the test range. As discussed, in an embodiment of the method 200 the test range may be from around a purge speed to a value around FSNL. For example, but not limiting of, the purge speed may by around 16% and FSNL may be around 100%—of the normal operating speed of the shaft 137. Here, the test range may be from around 16% to around 95%. If the speed of the shaft 137 is within the test range then the method 200 may proceed to step 225; otherwise the method 200 may proceed to step 235.

In step 225, the method 200 may determine whether the test permissive of step 210 is maintained. Operational events may cause the test permissive to change state. For example, a fuel system issue may lead to a premature flameout and loss of the test permissive. If the test permissive is not maintained, then the method 200 may proceed to step 235; otherwise the method 200 may proceed to step 230.

In step 230, the user may manually abort the test. A user may discover a reason, operationally or otherwise, for aborting the test. For example, a user may discover that a flame detector is not providing a reliable indication of flame status; and flame status may be an important testing requirement. If the user aborts the test, then the method 200 may proceed to step 235; otherwise the method 200 may proceed to step 240.

In step 235, the method 200 may abort the test of the overspeed protection system. After the test is aborted, operation of the gas turbine 105 may revert to a fired shutdown sequence. A user may configure the method 200 to provide a notification that the testing was aborted. The notification may be an alarm of varying forms such as, but not limited to, an audio signal, a graphic, or a text message.

In step 240, illustrated in FIG. 2B, the default value of the overspeed trip set point is adjusted to a value within the test range. The new value may be influenced by a variety of mechanical, operational, and reliability factors. These factors may vary among powerplant machine types, combustion systems, operational conditions, fuel types, etc. The value may be set with a goal of minimizing the thermal transients associated with a trip. An embodiment of the present invention allows the user to input the replacement overspeed trip value, thereby providing an adjustment means for specific conditions. Alternatively, the present invention may be configured to automatically generate, and input a value for the replacement overspeed trip value.

After the overspeed trip set point is changed, the method 200 may proceed to step 245. Here, the gas turbine 105 may experience a fired shutdown overspeed trip. The trip may occur after the actual speed of the gas turbine 105 is near the fired shutdown overspeed set point.

The method 200, in step 250, may then determine whether the emergency protection system functioned correctly. In a combustion turbine, the emergency protection system generally operates to rapidly stop the fuel flow to the combustion system, thereby extinguishing combustion. Data recording means are typically used to verify that the components of the emergency protection system operated correctly. If the emergency protection system functioned correctly, then the method 200 may proceed to step 260, where the fired shutdown test is successful; otherwise the method 200 may proceed to step 255, where the fired shutdown test is unsuccessful. The present invention may be integrated with an alarm system that notifies the user whether or not the emergency protection system functioned correctly.

FIGS. 3A-3C (collectively FIG. 3) are schematics illustrating the method 200 of FIG. 2, in use, in accordance with an embodiment of the present invention. FIG. 3 illustrates the method 200 applying the shutdown methodology. Here, the gas turbine 105 may be decelerating from FSNL.

For simplicity, FIG. 3 primarily illustrates the gas turbine 105 of the powerplant 100 illustrates in FIG. 1. FIG. 3 also illustrates pertinent operational parameters of the gas turbine 105. These parameters include actual turbine speed 310 (as a percentage of normal operating speed); overspeed trip set point (as a percentage of normal operating speed) 320; and flame detectors of the combustion system 120. FIG. 3 also illustrates the gas fuel system 150 with a stop/speed ratio valve 152, and a plurality of gas control valves 154.

Referring specifically to FIG. 3A, which illustrates that the actual turbine speed 310 is 100%, the overspeed trip set point 320 is 110%, and the flame detector indicating flame. These parameters suggest that the turbine 100 is operating in a FSNL condition.

After a fired shutdown is initiated and the test permissive(s) is satisfied, the user may commence the fired shutdown overspeed testing. FIG. 3B illustrates the gas turbine 105 experiencing a fire shutdown with the actual turbine speed 310 at 50% and flame detector indicating flame. The present invention allows the user to manually abort the test, thereby resuming the fired shutdown on the gas turbine 105.

The overspeed test automatically adjusts the overspeed trip set point 320. Here, the set point 320 is lowered to 48%.

Soon after the set point 320 is changed, the overspeed protection system should trip the gas turbine 105, as illustrated in FIG. 3C. The trip of the gas turbine 105 rapidly stops the gas fuel flow to the gas turbine 105, thereby extinguishing the flame. FIG. 3C illustrates that the flame detector 130 does not indicate a flame presence. After the gas turbine 105 trips, the overspeed trip set point 320 may automatically reset to a default value.

FIGS. 4A-4C (collectively FIG. 4) are schematics illustrating the method 200 of FIG. 2, in use, in accordance with an alternate embodiment of the present invention. FIG. 4 illustrates the method 200 applying the start-up methodology. Here, the gas turbine 105 may be accelerating to FSNL.

For simplicity, FIG. 4 primarily illustrates the gas turbine 105 of the powerplant 100 illustrated in FIG. 1. FIG. 4 also illustrates pertinent operational parameters of the gas turbine 105. These parameters include actual turbine speed 410 (as a percentage of normal operating speed); overspeed trip set point (as a percentage of normal operating speed) 420; and flame detectors of the combustion system 120. FIG. 4 also illustrates the gas fuel system 150 with a stop/speed ratio valve 152, and a plurality of gas control valves 154.

Referring specifically to FIG. 4A, which illustrates that the actual turbine speed 410 is 0%, the overspeed trip set point 420 is 110%, and the flame detector not indicating flame. These parameters suggest that the turbine 100 is ready to commence operation in a start-up mode.

After a start-up is initiated and the test permissive(s) is satisfied, the user may commence the overspeed testing. FIG. 4B illustrates the gas turbine 105 experiencing a start-up with the actual turbine speed 410 at 22% and the flame detectors, of the combustion system 120, indicating flame. The present invention allows the user to manually abort the test, thereby resuming the start-up on the gas turbine 105.

The overspeed test automatically adjusts the overspeed trip set point 420. Here, the set point 420 is lowered to 20%.

Soon after the set point 420 is changed, the overspeed protection system should trip the gas turbine 105, as illustrated in FIG. 4C. The trip of the gas turbine 105 rapidly stops the gas fuel flow to the gas turbine 105, thereby extinguishing the flame. FIG. 4C illustrates that the flame detectors, of the combustion system 120 does not indicate a flame presence. After the gas turbine 105 trips, the overspeed trip set point 420 may automatically reset to a default value.

Figure 5:
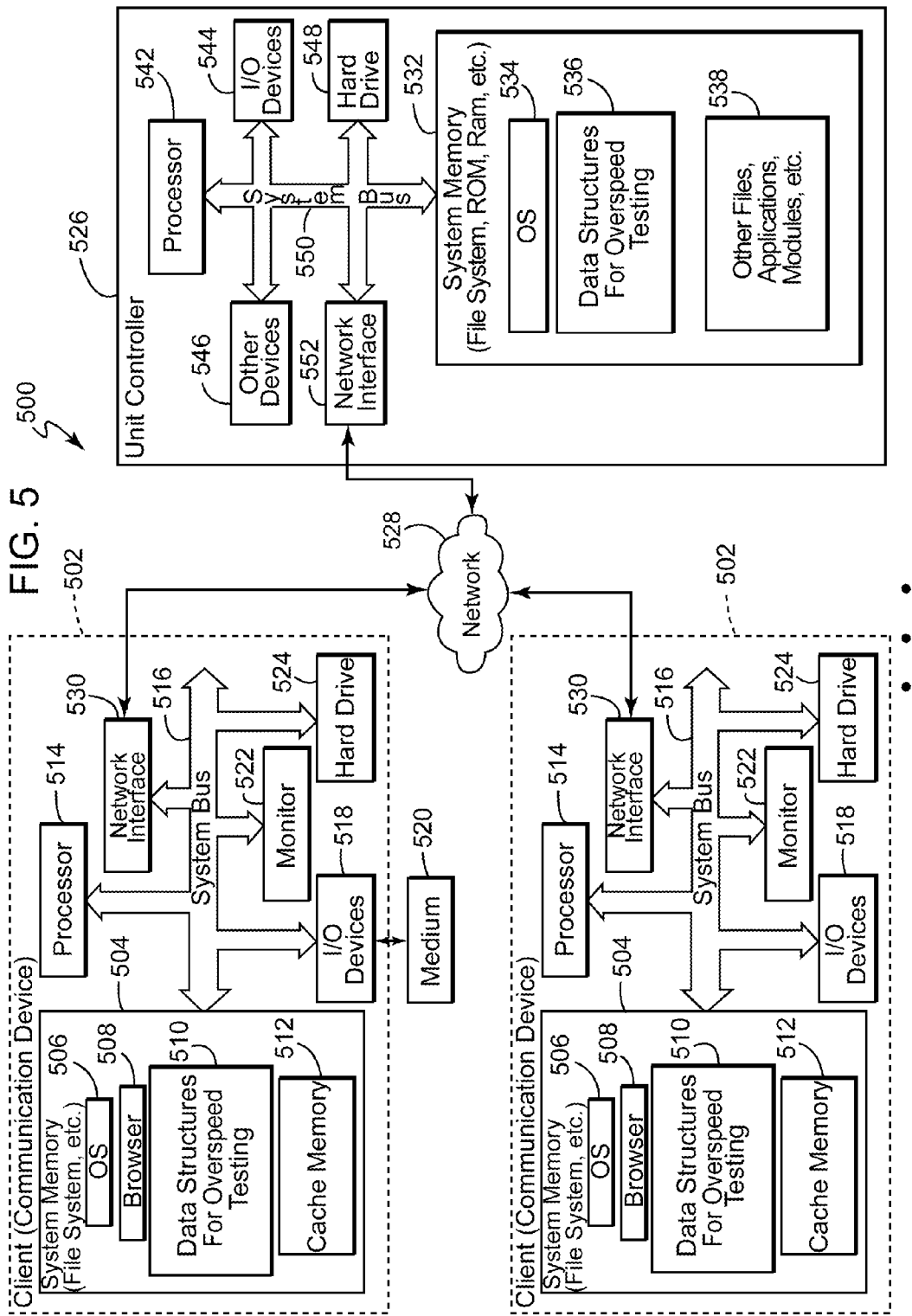
FIG. 5 is a block diagram of an exemplary system for testing an overspeed protection system in accordance with embodiments of the present invention.

FIG. 5 is a step diagram of an exemplary system 500 to automatically test the overspeed protection system in accordance with embodiments of the present invention. The elements of the method 200 may be embodied in and performed by the system 500. The system 500 may include one or more user or client communication devices 502 or similar systems or devices (two are illustrated in FIG. 5). Each communication device 502 may be a computer system, a personal digital assistant, a cellular phone, or similar device capable of sending and receiving an electronic message.

The communication device 502 may include a system memory 504 or local file system. The system memory 504 may include a read only memory (ROM) and a random access memory (RAM). The ROM may include a basic input/output system (BIOS). The BIOS may contain basic routines that help to transfer information between elements or components of the communication device 502. The system memory 504 may contain an operating system 506 to control overall operation of the communication device 502. The system memory 504 may also include a browser 508 or web browser. The system memory 504 may also include data structures 510 or computer-executable code to automatically test the overspeed protection system that may be similar or include elements of the method 200. The system memory 504 may further include a template cache memory 512, which may be used in conjunction with the method 200 to automatically store data from the most recent test.

The communication device 502 may also include a processor or processing unit 514 to control operations of the other components of the communication device 502. The operating system 506, browser 508, data structures 510 may be operable on the processor 514. The processor 514 may be coupled to the memory system 504 and other components of the communication device 502 by a system bus 516.

The communication device 502 may also include multiple input devices, output devices or combination input/output devices 518. Each input/output device 518 may be coupled to the system bus 516 by an input/output interface (not shown in FIG. 5). The input and output devices or combination I/O devices 518 permit a user to operate and interface with the communication device 502 and to control operation of the browser 508 and data structures 510 to access, operate and control the software to automatically test the overspeed protection system. The I/O devices 518 may include a keyboard and computer pointing device or the like to perform the operations discussed herein.

The I/O devices 518 may also include disk drives, optical, mechanical, magnetic, or infrared input/output devices, modems or the like. The I/O devices 518 may be used to access a medium 520. The medium 520 may contain, store, communicate or transport computer-readable or computer-executable instructions or other information for use by or in connection with a system, such as the communication devices 502.

The communication device 502 may also include or be connected to other devices, such as a display or monitor 522. The monitor 522 may be used to permit the user to interface with the communication device 502. The monitor 522 present images, graphics, or the like, which may be generated by the data structures 510 for automatically testing the overspeed protection system.

The communication device 502 may also include a hard disk drive 524. The hard drive 524 may be coupled to the system bus 516 by a hard drive interface (not shown in FIG. 5). The hard drive 524 may also form part of the local file system or system memory 504. Programs, software and data may be transferred and exchanged between the system memory 504 and the hard drive 524 for operation of the communication device 502.

The communication devices 502 may communicate with a remote server 526 and may access other servers or other communication devices similar to communication device 502 via a network 528. The system bus 516 may be coupled to the network 528 by a network interface 530. The network interface 530 may be a modem, Ethernet card, router, gateway or the like for coupling to the network 528. The coupling may be a wired connection or wireless. The network 528 may be the Internet, private network, an intranet or the like.

The server 526 may also include a system memory 532 that may include a file system, ROM, RAM and the like. The system memory 532 may include an operating system 534 similar to operating system 506 in communication devices 502. The system memory 532 may also include data structures 536 to automatically test the overspeed protection system. The data structures 536 may include operations similar to those described with respect to the method 200 for automatically testing the overspeed protection system. The server system memory 532 may also include other files 538, applications, modules and the like.

The server 526 may also include a processor 542 or a processing unit to control operation of other devices in the server 526. The server 526 may also include I/O device 544. The I/O devices 544 may be similar to I/O devices 518 of communication devices 502. The server 526 may further include other devices 546, such as a monitor or the like to provide an interface along with the I/O devices 544 to the server 526. The server 526 may also include a hard disk drive 548. A system bus 550 may connect the different components of the server 526. A network interface 552 may couple the server 526 to the network 528 via the system bus 550.

The flowcharts and step diagrams in the FIGS. illustrate the architecture, functionality, and operation of possible implementations of systems, methods and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the block diagrams and/or flowchart illustration, and combinations of steps in the block diagrams and/or flowchart illustration, can be implemented by special purpose hardware-based systems which perform the specified functions or acts, or combinations of special purpose hardware and computer instructions.

As one of ordinary skill in the art will appreciate, the many varying features and configurations described above in relation to the several exemplary embodiments may be further selectively applied to form the other possible embodiments of the present invention. Those in the art will further understand that all possible iterations of the present invention are not provided or discussed in detail, even though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed is:

1. A method of testing an overspeed protection system of a powerplant, the method comprising:
   providing a powerplant comprising a powerplant machine, a shaft, and an operational control system, wherein the operational control system is configured for operating the powerplant machine and comprises an overspeed protection system configured for detecting an overspeed event associated with the shaft;
   determining whether the speed of the shaft is within a testing range;
   changing an overspeed trip value to a value within the testing range; and
   determining whether the overspeed protection system would operate to trip the powerplant machine;
   wherein the method reduces the possibility of a trip occurring during testing of the overspeed protection system.

2. The method of claim 1, wherein the powerplant comprises multiple powerplant machines.

3. The method of claim 2, wherein the multiple powerplant machines comprise a gas turbine and a steam turbine, and wherein the shaft integrates the gas turbine and the steam turbine forming a steam and gas powertrain (STAG).

4. The method of claim 1, wherein the testing range comprises from about a purge speed to about a full-speed-no-load (FSNL) speed.

5. The method of claim 1 further comprising the step of selecting a methodology for testing the overspeed protection system, wherein the methodology comprises a shutdown mode procedure adapted for use when the powerplant machine is operating in a shutdown mode, and a start-up mode procedure adapted for use when the powerplant machine is operating in a start-up mode.

6. The method of claim 5, wherein the shutdown mode procedure performs the steps of:
   a. determining whether a testing permissive is satisfied;
   b. initiating a fired shutdown overspeed test; and
   c. changing an overspeed trip set point to a shutdown trip set point.

7. The method of claim 6, wherein the testing range comprises a shaft speed of from about a full-speed-no-load (FSNL) speed to about a purge speed.

8. The method of claim 7, wherein an emergency protection system controls a governor system associated with the powerplant machine, wherein the governor system partially controls a speed and an acceleration of the shaft.

9. The method of claim 8 further comprising the step of aborting the fired shutdown overspeed test if the testing permissive is not maintained.

10. The method of claim 9 further comprising the step of determining whether the emergency protection system controls the operation of the powerplant machine.

11. The method of claim 5, wherein the start-up mode procedure performs the steps of:
    a. determining whether a start-up of the powerplant machine has been initiated;
    b. determining whether a testing permissive is satisfied; and
    c. changing an overspeed trip set point to a start-up trip set point.

12. The method of claim 11, wherein the testing range comprises a shaft speed of from about a purge speed to about a full-speed-no-load (FSNL) speed.

13. The method of claim 12, wherein an emergency protection system controls a governor system associated with the powerplant machine, wherein the governor system partially controls a speed of the shaft.

14. The method of claim 13 further comprising the step of aborting the start-up mode procedure if the testing permissive is not maintained.

15. The method of claim 14 further comprising the step of determining whether the emergency protection system controls the operation of the powerplant machine.

16. A method of testing an overspeed protection system of a powerplant, the method comprising:
    providing a powerplant comprising a gas turbine and a steam turbine, and wherein a shaft integrates the gas turbine and the steam turbine forming a steam and gas powertrain (STAG);
    providing an operational control system, wherein the operational control system is configured for operating the STAG and comprises an overspeed protection system configured for detecting an overspeed event associated with the shaft;
    selecting a methodology for testing the overspeed protection system, wherein the methodology comprises a shutdown mode procedure adapted for use when the STAG is operating in a shutdown mode, and a start-up mode procedure adapted for use when STAG is operating in a start-up mode;
    determining whether the speed of the shaft is within a testing range;
    changing an overspeed trip value to a value within the testing range; and
    determining whether the overspeed protection system would operate to trip the STAG;
    wherein the method reduces the possibility of a STAG trip during testing of the overspeed protection system.

17. The method of claim 16, wherein the shutdown mode procedure performs the steps of:
    a. determining whether a testing permissive is satisfied;
    b. initiating a fired shutdown overspeed test; and
    c. changing an overspeed trip set point to a shutdown trip set point.

18. The method of claim 17, wherein the testing range comprises a shaft speed of from about a full-speed-no-load (FSNL) speed to about a purge speed.

19. The method of claim 16, wherein the start-up mode procedure performs the steps of:
    a. determining whether a start-up of the STAG has been initiated;
    b. determining whether a testing permissive is satisfied; and
    c. changing an overspeed trip set point to a start-up trip set point.

20. The method of claim 19, wherein the testing range comprises a shaft speed of from about a purge speed to about a full-speed-no-load (FSNL) speed.

* * * * *